United States Patent Office 3,478,069
Patented Nov. 11, 1969

3,478,069
4-OXO-Δ⁵-STEROIDS AND ENOL ESTERS THEREOF
Bernard Ellis, Vladimir Petrow, and David Neil Stanway, London, England, assignors to The British Drug House Limited
No Drawing. Filed Jan. 31, 1967, Ser. No. 612,833
Claims priority, application Great Britain, Feb. 17, 1966, 6,971/66
Int. Cl. C07c *169/34, 169/36, 167/32*
U.S. Cl. 260—397.4     9 Claims

ABSTRACT OF THE DISCLOSURE

Novel 4-oxo-Δ⁵-steroids, including the hormonally active compound 17α-acetoxy-16-methylenepregn-5-ene-4,20-dione, and their corresponding 4-enol esters and process for making same are disclosed.

---

This invention is for improvements in or relating to organic compounds, and has particular reference to enol esters derived from 4-oxo-Δ⁵-steroids.

It is an object of the present invention to provide novel 4-enol esters of 4-oxo-Δ⁵-steroids, which esters are represented by the partial formula

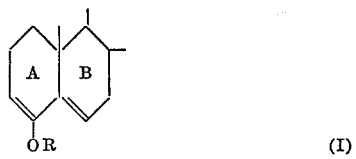

where R is an acyl radical derived from an aliphatic carboxylic acid containing not more than six carbon atoms. The compounds of the present invention are believed to have active biological properties of the type possessed by analogous known steroids in particular oestrogenic and progestational activity. They are also of value as intermediates in the preparation of novel hormonally active structures.

It is also an object of this invention to provide a process for the preparation of 4-enol esters of partial Formula I, which esters may be optionally converted into 4-oxo-Δ⁵-steroids.

It is a further object of this invention to provide the novel compound 17α-acetoxy-16-methylenepregn-5-ene-4,20-dione, which is of value on account of its oestrogenic and progestational activity.

The invention provides a process for the preparation of steroidal 4-enol esters of partial formula

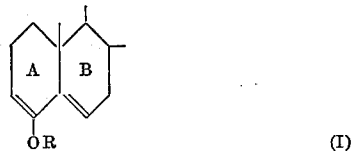

where R is an acyl radical derived from an aliphatic carboxylic acid containing not more than six carbon atoms which process comprises enol acylation of 4-oxo-Δ⁵-steroids of partial formula The starting materials of partial Formula II employed for the process of the invention may be prepared by methods of prior art or by the method of our co-pending application Ser. No. 612,363.

Methods of enol acylation which may be employed for converting a 4-oxo-Δ⁵-steroid (II) into a 4-enol acylate (I) include treatment of a 4-oxo-Δ⁵-steroid (II) with (a) a mixture of a lower aliphatic carboxylic acid anhydride and a catalytic amount of a strong organic acid, such as, for example, toluene-p-sulphonic acid, (b) a mixture of a lower aliphatic carboxylic acid chloride and a low aliphatic carboxylic acid anhydride, also, if desired, in the presence of an organic base, such as pyridine, and (c) isopropenyl acetate, preferably in a solvent such as benzene, toluene or xylene, and preferably in the presence of a catalyst such as toluene-p-sulphonic acid. The reaction times may vary between 30 minutes and 24 hours according to the procedure adopted and temperature employed.

The process of the invention may be applied to 4-oxo-Δ⁵-steroids containing standard steroidal substituents elsewhere in the molecule. It will be apparent to those skilled in the art that certain groupings, such as, for example, hydroxy, epoxy and oxo groups, may undergo reaction with the enol acylating reagent used, and due allowance should be made for this fact.

The 4-enol acylates of this invention may be hydrolysed, if desired, to 4-oxo-Δ⁵-steroids. It will be apparent to those skilled in the art that when 4-enol acylation of a 4-oxo-Δ⁵-steroid is accompanied by one or more further transformations elsewhere in the molecule, hydrolysis of the steroidal 4-enol acylate thus obtained may lead to a 4-oxo-Δ⁵-steroid which differs from that initially employed for conversion into a 4-enol acylate.

The invention provides the following novel steroidal 4-enol acylates:

4,17α-diacetoxypregna-3,5-dien-20-one
4,17α-diacetoxy-16-methylenepregna-3,5-dien-20-one
4,17β-diacetoxyandrosta-3,5-diene
17β-acetoxy-4-n-butyroxyandrosta-3,5-diene.

The invention also provides the novel 4-oxo-Δ⁵-steroid, 17α-acetoxy-16-methylenepregn-5-ene-4,20-dione.

Following is a description by way of example of methods of carrying the invention into effect.

EXAMPLE 1

4,17α-diacetoxypregna-3,5-dien-20-one

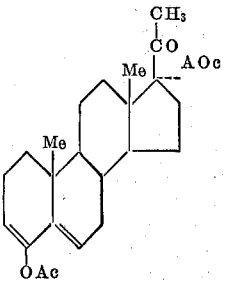

17α-hydroxypregn-5-en-4,20-dione (prepared by the method described in our copending application Ser. No. 612,363 (0.3 g) dissolved in acetic anhydride (7.5 ml.), was treated with toluene-p-sulphonic acid (0.3 g.), and the mixture kept at room temperature for 16 hours. Water (50 ml.) was added and the product extracted into ether. The ethereal solution was washed with saturated aqueous sodium bicarbonate until neutral, dried over sodium sulphate, and the solvent evaporated. The residue was purified by chromatography on alumina. Recrystallisation from a mixture of acetone and hexane gave 4,17α - diacetoxypregna-3,5-dien-20-one, M.P. 211° C., $[\alpha]_D^{29°}$ —100.5°, $\lambda_{max}$. 230 mμ (ε 16,700), 236 mμ (ε 18,300) and 243 mμ (ε 12,300).

EXAMPLE 2

4,17α-diacetoxy-16-methylenepregna-3,5-dien-20-one

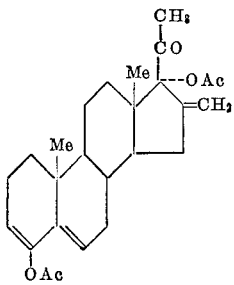

(a) 16α,17α - epoxy - 16β - methylpregn - 5 - en - 4, 20-dione (prepared by the method described in our copending application Ser. No. 612,363 (1 g.) dissolved in acetic anhydride (1 ml.) and dioxan (4 ml.) was heated to 90° C., and toluene-p-sulphonic acid (0.1 g.) added. The mixture was heated at 90° C. for a further 2 hours, poured into water (20 ml.) and the precipitate collected. The crude product was purified by chromatography on alumina. Recrystallisation from acetone gave 4,17α-diacetoxy-16 - methylenepregna - 3,5 - dien - 20-one, M.P. 221.5° C., $[\alpha]_D^{21°}$ —196.3°, $\lambda_{max}$. 230 mμ (ε 17,700), 236 mμ (ε 19,100) and 244 mμ (ε 12,700).

(b) A solution of 4,17α - diacetoxy - 16 - methylenepregna - 3,5-dien-20-one (0.5 g.) in ethanol (25 ml.) and 2 N aqueous hydrochloric acid (5 ml.) was heated under reflux for 1 hour. The solvents were then evaporated to about 10 ml., water (10 ml.) added, and the precipitate collected. Recrystallisation of this material from ethanol gave 17α - acetoxy - 16 - methylenepregn-5-en-4,20-dione, M.P. 194° C., $[\alpha]_D^{22°}$ —178.9°, $\lambda_{max}$. 240 mμ (ε 7,070) represented by the formula

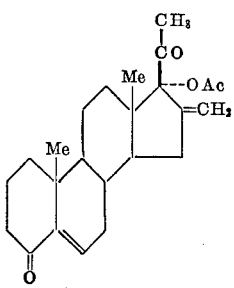

EXAMPLE 3

4,17α-diacetoxy-16-methylenepregna-3,5-dien-20-one

17α - hydroxy - 16 - methylenepregn - 5 - en - 4,20-dione (prepared by the method described in our copending application Ser. No. 612,363 (0.4 g.) dissolved in acetic anhydride (14 ml.) was treated with toluene-p-sulphonic acid (0.4 g.) and the mixture kept at room temperature for 16 hours. Water (100 ml.) was added and the product extracted into ether. The ether phase was washed with saturated aqueous sodium bicarbonate to neutrality, dried over sodium sulphate, and evaporated to dryness. The residue was purified by chromatography on alumina. Recrystallisation from acetone gave 4,17α-diacetoxy - 16 - methylenepregna - 3,5 - dien - 20 - one, M.P. 221.5° C.

EXAMPLE 4

4,17β-diacetoxyandrosta-3,5-diene

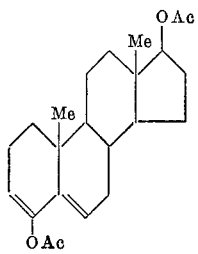

17β - acetoxyandrost-5-en-4-one (1 g.) and toluene-p-sulphonic acid (0.1 g.) were dissolved in benzene (40 ml.), 20 ml. of the solution were distilled off and isopropenyl acetate (10 ml.) added. The reaction mixture was then heated under reflux for 4 hours in an atmosphere of nitrogen, cooled, the toluene-p-sulphonic acid neutralized with anhydrous sodium acetate, and the solution concentrated by evaporation under reduced pressure. The residue was extracted into ether, the ethereal solution washed with dilute sodium bicarbonate solution, dried over sodium sulphate and evaporated to dryness to give 4,17β-diacetoxyandrosta-3,5-diene, $\nu_{max}^{CH_2Cl_2}$ 1757, 1663 and 1632 cm.$^{-1}$

EXAMPLE 5

17β-acetoxy-4-n-butyroxyandrosta-3,5-diene

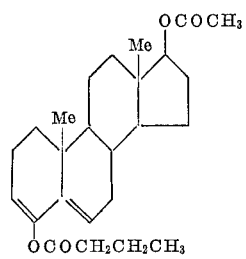

17β-acetoxyandrost-5-en-4-one (1 g.) dissolved in n-butyric anhydride (15 ml.), n-butyryl chloride (7 ml.), and pyridine (0.7 ml.) was heated at 100° C., for 3½ hours. The reaction mixture was then evaporated to dryness under reduced pressure and the residue purified by recrystallisation to give 17β-acetoxy-4-n-butyroxyandrosta-3,5-diene.

We claim:
1. 4,17α - diacetoxy - 16-methylenepregna-3,5-diene-20-one.
2. 17α-acetoxy-16-methylenepregn-5-ene-4,20-dione.
3. A process for the preparation of a 4,17α-diacyloxy-16 - alkylene-pregna-3,5-dien-20-one, wherein acyl is derived from a lower aliphatic carboxylic acid, comprising treating a 16α,17α-epoxy-16β-alkylpregn-5-en-4,20-dione, a 17α-hydroxy or 17α-acyloxy-16-alkylene pregn-5-en-4, 20-dione with an enol acylating reagent selected from the following:
   (a) a mixture of a lower aliphatic carboxylic acid anhydride and a catalytic amount of a strong organic acid,
   (b) a mixture of a lower aliphatic carboxylic acid anhydride and a lower aliphatic carboxylic acid chloride, and
   (c) isopropenyl acetate.
4. A process of claim 3 wherein the enol acylating reagent is a mixture of a lower aliphatic carboxylic acid anhydride and a catalytic amount of a strong organic acid.
5. The process of claim 4 wherein the strong organic acid is toluene-p-sulfonic acid.
6. The process of claim 3 wherein the enol acylating reagent is a mixture of a lower aliphatic carboxylic acid chloride and lower aliphatic carboxylic acid anhydride.

7. The process of claim 6 wherein pyridine is present in the enol acylating reagent mixture.

8. The process of claim 3 wherein the enol acrylating reagent is isopropenyl acetate.

9. The process of claim 8 wherein the isopropenyl acetate is employed in a solvent comprising a compound selected from the group consisting of benzene, toluene and xylene and in the presence of toluene-p-sulfonic acid as catalyst.

References Cited

Shoppee et al. J. Chem. Soc. 4/62 pp. 1246–54.
Djerassi, Steroid Reactions, pp. 37–42, Holden Day, San Francisco 1963 ed.

ELBERT L. ROBERTS, Primary Examiner

U.S. Cl. X.R.

260—999, 397.5